United States Patent [19]

Walters

[11] Patent Number: 5,005,965

[45] Date of Patent: Apr. 9, 1991

[54] SPECTACLE FRAMES

[75] Inventor: Donald Walters, High Springs, Fla.

[73] Assignee: University of Florida, Gainesville, Fla.

[21] Appl. No.: 405,968

[22] Filed: Sep. 12, 1989

[51] Int. Cl.$^5$ .................................................. G02C 3/00
[52] U.S. Cl. ...................................... 351/119; 351/155
[58] Field of Search ............... 351/119, 123, 133, 155, 351/156, 158

[56] References Cited

U.S. PATENT DOCUMENTS 3,563,640  2/1971  Wise et al. ........................... 351/158
3,944,344  3/1976  Wichers ............................... 351/123

FOREIGN PATENT DOCUMENTS 2204143  11/1988  United Kingdom ................. 351/156

Primary Examiner—Rodney B. Bovernick
Assistant Examiner—J. P. Ryan
Attorney, Agent, or Firm—Kerkam, Stowell, Kondracki & Clarke

[57] ABSTRACT

Spectacle frames are provided for use with either prescription lenses, safety lenses, or the like, the frames having a lens-holding substructure with two lens-holding rims joined at the center section by a bridge piece, and two head-engaging members pivotably attached at or near the bridge piece to a top surface thereof, and extending upwardly and around to the side of a wearer's head, the head-engaging members terminating at ear-engaging portions. The pivotable attachment of the head-engaging members to the lens-holding substructure is effected by snap-fitting a cylindrical pin having a ball element at its end, which extends from a forward end of each head-engaging member, into one of a pair of cylindrical bores, each terminating at a spherical socket, which are disposed at and extend into the lens-holding substructure at or near the bridge piece.

17 Claims, 1 Drawing Sheet

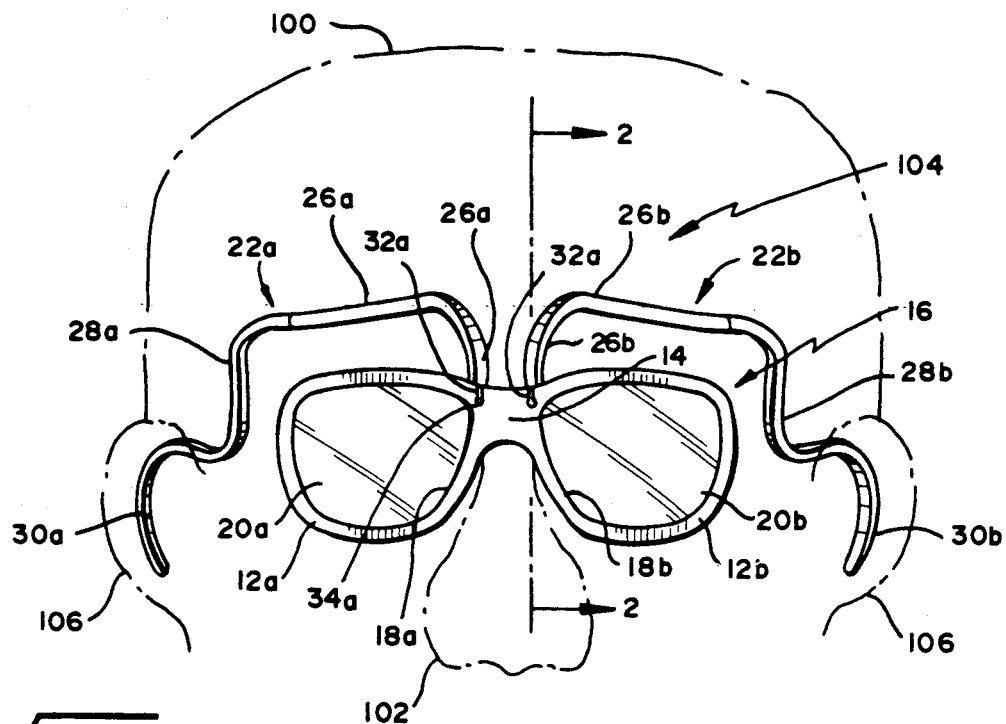
FIG. 1
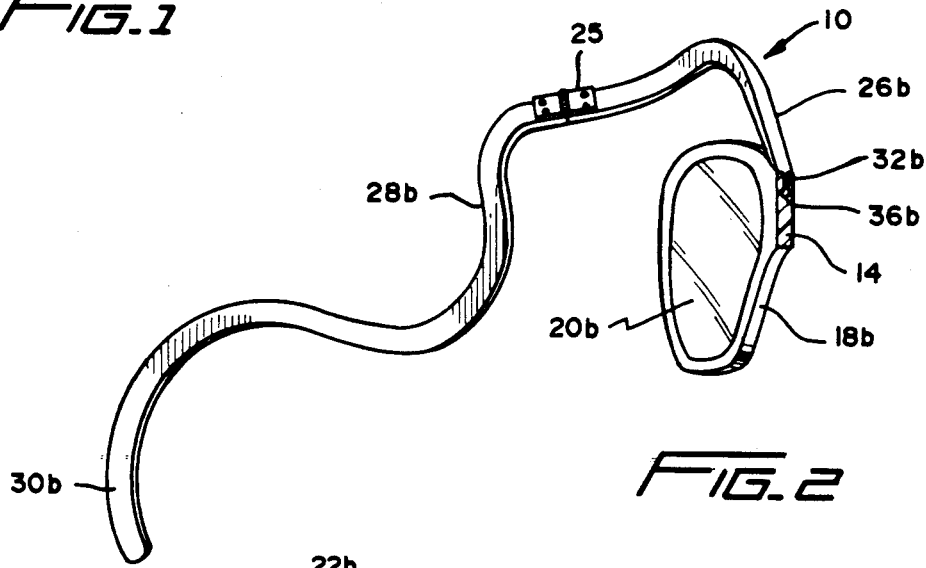
FIG. 2
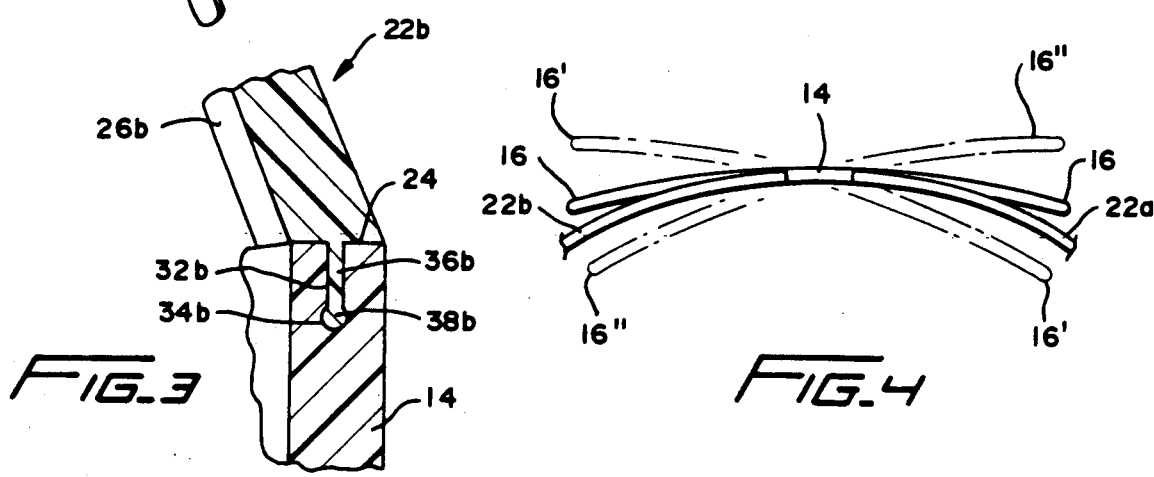
FIG. 3
FIG. 4

SPECTACLE FRAMES

BACKGROUND OF THE INVENTION

1. Field of the Invention

The present invention relates to spectacle frames used to support prescription lenses, safety glasses or the like, on a wearer's head.

2. Background Information

Heretofore, several types of frames or supports for eyeglass lenses have been propounded as improvements or alternatives to standard eyeglass frames which employ elements commonly referred to as 'temples' extending from a side of each lens to hook over the ears of the wearer. A variation shown in several previously issued U.S. Pat. employs a headband circling the skull from which a frame holding the two lenses is suspended. Included in at least one example, U.S. Pat. No. 4,152,051, is the capability to pivot the lenses to fixed position and out of the line of sight of wearer about a horizontal axis. While the use of a headband may be considered by some to be more comfortable and convenient than conventional frames, others are likely to be bothered by the restrictive feeling imparted around the head by the elasticity of the band.

With the many uses of eye apparel for safety as well as vision correction, it should suffice to say that those working in fields where eyeglasses, safety glasses or goggles are commonly used or encountered continue to endeavor to design frames and supports for improving the comfort and/or safety of wearing such eye apparel.

It is therefore an important object of the present invention to provide a frame for holding lenses in position on a wearer's head which provides improved protection, stability and comfort to the wearer.

It is a further object of the present invention to provide a frame for holding lenses in position which improves the safety of wearing vision correcting or safety glasses.

It is a further object of the present invention to provide a frame for holding lenses in position which provides improved protection of the eye area of the face.

It is a further object to provide a pair of eyeglasses, safety glasses, or sunglasses employing the improved frame of the present invention.

It is yet a further object to provide a spectacle frame for holding lenses in position which comprises a lens holding substructure having two lens holding rims, a bridge piece connecting the lens holding rims in a spaced-apart relationship to one another, and two head-engaging members pivotably attached to the substructure at or near the bridge of the frame and extending vertically upwardly to approximately a mid-forehead position, the head-engaging members then diverging in a horizontal manner and being curved to approximate the curvature of the forehead and temple areas of a wearer's head, the head-engaging members further having vertically downward extending portions terminating at ear-engaging curved portions.

It is a further object of the present invention to provide a frame wherein the means for pivotably attaching the head-engaging members at or near the bridge comprises two cylindrical bores extending vertically into the frame and terminating at a spherically shaped socket, and a corresponding cylindrical pin extending from each of the head-engaging members, each pin having a spherical ball element at its end, and wherein the head-engaging members are connected to the substructure in a snap-fit type connection.

SUMMARY OF THE INVENTION

The above and other objects of the present invention are accomplished by a frame designed to be stably supported on the head of a wearer, and to be flexible or yieldable upon certain impacts or motions due to forces encountered during use and wear.

The frames of the present invention have a lens-holding substructure comprising two lens-holding rims connected and spaced apart by a bridge piece, much like common plastic frame prescription eyeglasses or sunglasses. However, instead of employing side temples extending straight back to the ear from either side of the lens holding rims to engage the head behind the ears, as is done with most common eyeglass frames, the lens-holding rims are suspended in position by head-engaging members which attach at or near the bridge piece of the frame.

Furthermore, the head-engaging members are not merely pivotably attached with conventional hinges to facilitate folding and storage of the eyeglasses as are conventional eyeglass frames, but are instead pivotably attached such that the bridge piece and rims may deflect in response to impact or the like, thereby increasing safety in wearing the frames. The pivot means in the present invention is a pair of bores terminating at substantially spherical sockets extending into the bridge piece or a portion of the lens-holding rims immediately adjacent the bridge, and a pin extending from each of the head-engaging members terminating at a spherical ball corresponding in size to the socket in the frame substructure. The head-engaging members are thus snapped into the substructure, whereupon they are each capable of independently and cooperatively pivoting through a much wider range of motion than conventional temples, particularly as worn on the head of the user. The head-engaging members are also provided with the more conventional hinges at a location removed from this connection to the bridge, thereby facilitating storage when not in use.

A further feature of the present invention is the configuration of the head-engaging members, which are shaped to approximate the normal contours of the head from the mid-forehead area around the sides of the head, which terminate at an ear-engaging portion.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views, and wherein:

FIG. 1 represents a front elevation view of the spectacle frames of the present invention, shown as the frames would be worn on the head (in broken lines);

FIG. 2 represents a side view of the spectacle frames of the present invention sectioned at line 2—2 of FIG. 1;

FIG. 3 represents an exploded sectional view of the joint formed between the head-engaging member and the bridge piece of the frames; and FIG. 4 is a top plan view of the spectacle frames of the present invention, depicting deflection motions in broken lines.

DETAILED DESCRIPTION OF THE PREFERRED EMBODIMENT

Referring initially to FIG. 1, the spectacle frames according to a preferred embodiment of the present invention, designated generally by numeral 10, are shown in position on the head 100 of the wearer. Frames 10 comprise two open lens-holding rims 12a, 12b connected to one another by integral bridge piece 14. This integral portion of the frame 10 will be referred to herein as a lens-holding substructure 16. The bridge piece 14 is sized to maintain a space between rims 12a, 12b such that the apertures in the rims 12a, 12b are disposed substantially directly in front of a wearer's eyes when the frames are worn. The inner portions 18a, 18b, of the rims and the bridge 14 are adapted to straddle the nose 102 of the wearer's head 100.

Lenses 20a, 20b, are securely carried in the lens holding rims 12a, 12b, in a conventional manner. It is to be noted that the lens holding substructure 16 as described to this point in the detailed description is not unlike basic lens carrying substructures which are well known in the art.

The head-engaging members 22a, 22b, and the manner of connection of the head-engaging members 22a, 22b, to the bridge piece 14 provide significant improvement in stability, comfort, and safety in wearing the frames 10. The head-engaging members 22a, 22b of the present invention are pivotably attached, as will be described later, to a central portion of lens-holding substructure 16 at or near the bridge piece 14 and preferably at an upper surface 24 (FIG. 3) thereof.

Each of head-engaging members 22a, 22b, is preferably comprised of two sections joined by a hinge 25 (FIG. 2) primarily for ease of storage. A first end, herein termed front section 26a, 26b, of each member attaches to lens-holding substructure 16 and extends upwardly therefrom in a substantially vertical manner. The orientation of these front sections 26a, 26b, once placed on the wearer's head 100 is preferably either exactly vertical or substantially vertical having a slight 'rearward' angle of inclination toward a forehead 104 of the wearer. A nearly right-angle bend in each of these front sections 26a, 26b is made at approximately a midforehead level of the wearer, front sections 26a, 26b extending from the bend in a substantially horizontal orientation. These horizontally-extending portions diverge from one another and will preferably possess a slight front-to-back curvature which approximates the curvature of the forehead 104 and sides of the head 100 of a wearer.

The hinge 25 (FIG. 2) joins and fastens each of front sections 26a, 26b to a second end, herein termed a rear ear-engaging section 28a, 28b. As shown in FIGS. 1 and 2, these rear sections 28a, 28b are preferably designed, when folded out into wearing position, to continue the curvature in the horizontal orientation begun by front sections 26a, 26b, around the side of the head 100. At a point just forward of the ear 106 of the wearer, the rear sections 28a, 28b contain a substantially vertically downwardly extending portion which preferably ultimately terminates with a vertically curved C-shaped ear-engaging portion 30a, 30b.

The spectacle frames 10 are therefore stably supported on the head 100 by the ear-engaging portions 30a, 30b, and the bridge piece 14, being held in suspension by head-engaging members 22a, 22b. One advantage provided by shaping the spectacle frames 10 as described above and depicted is that when the wearer's head is tilted forward, a very common head movement, the frames are less susceptible than are conventional spectacle frames to slipping down the nose 102 or straight off of the head 100.

The attaching means for pivotably attaching the head-engaging members 22a, 22b to the lens-holding substructure 16 will now be described with reference particularly to FIGS. 1, 2 and especially FIG. 3. It should be noted at this point that the connections are primarily shown in sectional form to provide the clarity required, and therefore both of head-engaging members 22a, 22b, are not shown in FIGS. 2 and 3. It is to be understood that head-engaging members 22a, 22b, depicted in FIG. 1 will preferably be connected in an identical manner.

Lens-holding substructure 16 is preferably provided with a pair of spaced apart, vertically disposed cylindrical bores 32a, 32b, extending into the substructure 16 from the upper surface 24 thereof. At the innermost extremity of each of these bores 32a, 32b, a spherically shaped socket 34a, 34b, is provided, the sockets each having a diameter which is slightly larger than the diameter of the bores 32a, 32b. The bores 32a, 32b and their associated sockets 34a, 34b are preferably disposed in the bridge piece 14 of the substructure 16, although it would be possible to have the bores 32a, 32b disposed immediately adjacent bridge piece 14 at the inner portions 18a, 18b of the rims, provided these portions 18a, 18b have a sufficiently long vertical dimension.

Each of the front sections 26a, 26b of head-engaging members 22a, 22b is provided with a fastening projection at a forward extremity thereof, the fastening projection comprising a cylindrical pin 36a, 36b having a spherical ball element 38a, 38b integral with the pin or securely attached at the end of pin 36a, 36b. The pin 36a, 36b and ball element 38a, 38b parts of the fastening projections are sized to fit snugly into the bores 32a, 32b and associated sockets 34a, 34b in the lens-holding substructure 16. As best shown in FIG. 3, the fastening projections may be formed integrally with the front section 26b of the head-engaging member 22b from a substantially rigid polymeric material commonly used in the art for temples for spectacle frames. Alternatively, these projections could be made of another material, such as stainless steel, and embedded substantially permanently in the first end or front section 26b of head-engaging member 22b.

The diameter of the spherical sockets 34a, 34b and the associated spherical ball elements 38a, 38b is slightly larger than the diameter of the cylindrical bore, such that the fastening projection may be inserted and snap-fitted into the lens-holding substructure 16 to be securely retained therein. In order to effect this snap-fit type connection, the larger spherical ball element 38a, 38b must be inserted through a smaller diameter opening, namely cylindrical bores 32a, 32b. Lens-holding substructure 16 is preferably made of a hard, substantially rigid polymeric material, but also preferably has a limited amount of resiliency such that the portion of the substructure 16 surrounding the bore is capable of resilient outward deflection to allow ball elements 38a, 38b to pass through into sockets 34a, 34b when insertion is attempted.

The cylindrical pins 36a, 36b and associated ball elements 38a, 38b, extend in a fixed relationship from the ends of the front sections 26a, 26b of head-engaging members 22a, 22b in an orientation such that the part of front sections 26a, 26b immediately adjacent cylindrical pins 36a, 36b will assume a substantially vertical or slightly rearwardly inclined orientation referred to earlier in the description. When connected in this manner, each of head-engaging members 22a, 22b is capable of being independently rotated or pivoted through substantially 360° about the vertical axis of its associated pin 36a, 36b.

In order to fully appreciate the advantages of the means for pivotably attaching head-engaging members 22a, 22b, in the spectacle frames 10 of the present invention, the reaction of conventional frames to impact forces or other similar forces will be described and compared to the frame 10 of the present invention.

Conventional spectacle frames have two temple elements attached at the side extremities of an equivalent of the lens-holding substructure of the present invention. These temples are generally attached by way of a hinge, and are designed to pivot into a substantially right angle relationship to the lens-holding substructure. The forward ends of the temples are designed in these conventional frames to abut the lens-holding substructure upon reaching the predetermined, substantially right-angle relationship, thereby prohibiting further outward rotation of the temples. A problem with this conventional design is that when the frame substructure is impacted at or near one of the sides, the temple element on that side is restrained from pivoting beyond the right angle position to assist in absorbing the shock of the impact. Rather, the abutment of the temple against the lens-holding substructure tends to transfer the force of the impact to the area where the lens-holding substructure rests on the nose or where the temple engages the ear. Sufficiently high impact forces often cause temples to break at a point adjacent to their hinge attachment points as they are urged by the impact force to pivot outwardly. In other instances, the spectacles may be either completely knocked off the head of the wearer, or into a cocked position wherein the lenses are no longer in a position of usefulness to the wearer.

As seen especially in FIG. 4, the spectacle frames 10 of the present invention do not react in the same manner to such impacts, thereby avoiding the above-identified disadvantage of conventional frames. The spectacle frame 10 comprising lens-holding substructure 16 and head-engaging members 22a, 22b, is shown is solid lines in the normal wearing orientation. The broken lines are provided to show the position of the lens-holding substructure 16' and 16" in reaction to impact forces (or other like forces) directed toward the head of the wearer at opposite sides of bridge piece 14. Lens-holding substructure 16' is representative of deflection due to forces applied to the substructure anywhere at the right side of bridge piece 14 and substructure 16" is shown as being representative of deflection due to forces applied to the substructure anywhere at the left side of bridge piece 14.

The movement of lens-holding substructure 16 from the normal wearing position to the deflection positions 16', 16" is facilitated by the pivotable connection of the head-engaging members 22a, 22b to lens-holding substructure 16. For example, in moving from the normal wearing position (solid lines) to deflection position 16', the lens-holding substructure 16 pivots with respect to both of head-engaging members 22a, 22b. In the top view of FIG. 4, head-engaging member 22a is moved a slight distance toward a wearer's head 100 (FIG. 1) and pin 36a and ball element 38a pivot or rotate within cylindrical bore 32a and socket 34a in a counterclockwise manner. At the same time, head-engaging member 22b is moved a slight distance away from the wearer's head, and pin 36b and ball element 38b pivot within cylindrical bore 32b and socket 34b in a clockwise manner.

The movement of lens-holding substructure 16 from the normal wearing position to deflection position 16" causes head-engaging members 22a, 22b to move in exactly the opposite directions than in the example described above with respect to deflection position 16'. Most significantly, the cooperative pivoting or rotation of the head-engaging members 22a, 22b with respect to lens-holding substructure 16 is reversed. Head-engaging member 22a must now pivot in a clockwise manner with respect to bore 32a and head-engaging member 22b must now pivot in a counterclockwise manner with respect to bore 32b as viewed in FIG. 4. Both head-engaging members are thus capable of pivoting in either direction from the normal wearing position, when necessary.

The ability of spectacle frames 10 to permit lens-holding substructure 16 to be deflected in this manner provides an improvement in the shock absorbing capabilities of the spectacle frames 10 of the present invention, thereby improving comfort, stability and safety in the wearing of spectacles or safety-type glasses.

The frames 10 of the present invention are not limited to use with a specific 'type' of lens. Prescription lenses, safety (impact resistant) lenses, and sunglass lenses may all be used with frames 10, as well as any other type of lens. Additionally, the frames 10 need not necessarily have lens-holding rims which completely encircle the lens as depicted, but may employ other lens retaining means known in the art.

Further modifications to the depicted preferred embodiment are also possible, while maintaining the advantages of the present invention. For example, it may be possible to reverse the manner of connection of the head-engaging members to the lens holding substructure by providing a bore and socket into each of the head-engaging members which would be adapted to receive a pin and ball element embedded partially in and extending upwardly from a bridge piece or an area immediately adjacent the bridge piece of the lens-holding substructure.

Therefore, although specific details and elements have been identified in the foregoing description of the preferred embodiment, it is to be appreciated that this is intended to be for illustrative purposes only. Numerous modifications and adaptations may be readily apparent to those skilled in the art. Accordingly, the scope of the present invention is to be determined by reference to the appended claims.

What is claimed is:

1. Spectacle frames comprising:
   substructure means for holding a pair of lenses, said substructure means comprising a first and a second rim means for retaining a lens therein, and a bridge piece attached to said first and second rim means adapted to maintain a predetermined spacing between said rims; and
   first and second head-engaging members, a first end of each of said head-engaging members having means for pivotally attaching said head-engaging members to said substructure means at a top central portion of said substructure, each of said first ends of said head-engaging members extending upwardly to a predetermined distance in a substantially vertical orientation from said top central portion of said substructure; said means for pivotably attaching said head-engaging members to said substructure comprising a first and a second cylindrical bore extending inwardly into said substructure means from said top central portion of said substructure means and each of said first and second head-engaging members having a cylindrical pin extending from a first end thereof, each of said cylindrical bores being adapted to receive and retain one of said cylindrical pins; a second end of said first head-engaging member being adapted to engage one ear on a head of a wearer, and a second end of said second head-engaging member being adapted to engage the other ear on the head of the wearer.

2. Spectacle frames as defined in claim 1 wherein said means for pivotably attaching said head-engaging members to said substructure means further comprises a spherical socket disposed at and in communication with a terminal end of each of said cylindrical bores, each of said spherical sockets having a diameter larger than a diameter of said bores, and wherein a substantially spherical ball element is disposed at an end of each of said cylindrical pins extending from said first and said second head-engaging members, each of said ball elements having a diameter approximately equal to the diameter of said spherical sockets.

3. Spectacle frames as defined in claim 2 wherein said bridge piece is adapted to be positioned in a substantially horizontal orientation on a head of a wearer, said cylindrical bores are disposed in a substantially vertical orientation, whereby said cylindrical pins are pivotable in said bores about a vertical axis of said pins.

4. Spectacle frames as defined in claim 3 wherein said first and second cylindrical bores are spaced apart at a predetermined distance approximately equal to a width of said bridge piece.

5. Spectacle frames as defined in claim 4, wherein each of said first ends of said head-engaging members extends substantially vertically upwardly to a predetermined distance, and is integrally joined to a substantially horizontally disposed portion of said head-engaging member at a substantially right angle bend in each of said head-engaging members.

6. Spectacle frames as defined in claim 5 wherein said horizontally disposed portion is located at approximately a mid-forehead level of a wearer when said spectacle frames are in position on a head of said wearer.

7. Spectacle frames as defined in claim 6 wherein each of said horizontally disposed portions of said head-engaging members is shaped to approximate a curvature of said head from a front of said head to a side of said head, said horizontally disposed portion of said first head-engaging member adapted to curve around to a first side of said head, and said horizontally disposed portion of said second head-engaging member adapted to curve around to a second side of said head.

8. Spectacle frames as defined in claim 7 wherein each of said head-engaging members is constructed of two pieces and joined by a hinge.

9. Spectacle frames as defined in claim 8 wherein said two pieces of each of said head-engaging members meet and are joined by said hinge at said horizontally disposed portions.

10. Spectacle frames as defined in claim 9 wherein each of said horizontally disposed portions of each of said head-engaging members is integrally connected to one of said second ends of said head-engaging members.

11. Spectacle frames comprising:
substructure means for retaining a pair of lenses in a spaced-apart relationship, said substructure means comprising a substantially horizontally disposed bridge piece having rim means depending laterally from a first and a second side thereof for holding said pair of lenses; and
a first and second head-engaging member attached to and extending upwardly to a predetermined height from said bridge piece, each of said piece and said second head-engaging members having pivot means for pivotably attaching said head-engaging members to said bridge piece, further being adapted to pivot about a substantially vertical axis with respect to said substantially horizontally disposed bridge piece; wherein said pivot means comprises a first and a second cylindrical bore disposed in said substructure means and extending substantially vertically downwardly from a top surface thereof, said first and second bores being spaced apart at a predetermined distance approximately equal to a width of said bridge piece, a first cylindrical pin extending from a first end of said first head-engaging member, a second cylindrical pin extending from a first end of said second head-engaging member, and first means for retaining said first pin in said first bore and second means for retaining said second pin in said second bore.

12. Spectacle frames as defined in claim 11 wherein said first and second retaining means comprise a substantially spherical socket at an innermost portion of each of said first and said second bores, said sockets having a diameter larger than said bores, and a substantially spherical ball element at an end of each of said first and second cylindrical pins, a diameter of each of said ball elements being substantially equal to said diameter of said sockets whereby said ball elements will be securely captured in said sockets upon insertion.

13. Spectacle frames as defined in claim 12 wherein said first and said second head-engaging members each have a substantially horizontal element joined to said upwardly extending portions attached to said bridge piece, said horizontal element of said first head-engaging member being shaped to approximate a curvature of a front and a first side of a head of a wearer, said horizontal element of said second head-engaging member being shaped to approximate a curvature of a front and a second side of said head.

14. Spectacle frames as defined in claim 13 wherein each of said first and second head-engaging members has a second end adapted to engage an ear of said wearer.

15. A frame for holding a pair of lenses comprising:
substructure means for retaining said lenses, comprising a substantially horizontal bridge piece having rim means depending laterally from a first and second side thereof for holding a pair of lenses;
a first and a second head-engaging member attached to and extending upwardly to a predetermined height from said bridge piece, each of said first and second head-engaging members having pivot means for pivotably attaching said head-engaging members to said substructure means;

said attaching means further comprising a first and a second bore extending downwardly from a top surface of said substructure means in a substantially vertical orientation, each of said bores having a spherical socket at an innermost extent, each of said spherical sockets having a larger diameter than a cross-sectional dimension of said bores, a first pin extending from a first end of said first head-engaging member, a second pin extending from a first end of said second head-engaging member, each of said first and second pins having a ball element disposed at an end thereof and adapted to be securely captured in one of said spherical sockets upon insertion thereinto;

said first head-engaging member being adapted to extend from a front portion of a head of a wearer to a first side of said head, said first head-engaging member further being adapted to engage a first ear of said wearer, and said second head-engaging member being adapted to extend from a front portion of said head to a second side of said head, said second head-engaging member further adapted to engage a second ear of said wearer.

16. A frame as defined in claim 15 wherein said first and said second pins and associated ball elements are formed integrally with said first ends of said first and second head-engaging members, wherein said first and second head-engaging members, and said first and second pins and associated ball elements are all made of a substantially rigid polymeric material.

17. A frame as defined in claim 15 wherein said first and second pins and associated ball elements are made of steel and are substantially permanently embedded in said first and second head-engaging members.

* * * * *